(12) United States Patent
Clingman

(10) Patent No.: US 7,579,755 B2
(45) Date of Patent: Aug. 25, 2009

(54) ELECTRICAL-TO-MECHANICAL TRANSDUCER APPARATUS AND METHOD

(75) Inventor: Dan J. Clingman, Auburn, WA (US)

(73) Assignee: The Boeing Company, Chicago, IL (US)

( * ) Notice: Subject to any disclaimer, the term of this patent is extended or adjusted under 35 U.S.C. 154(b) by 489 days.

(21) Appl. No.: 11/551,525

(22) Filed: Oct. 20, 2006

(65) Prior Publication Data

US 2008/0100178 A1 May 1, 2008

(51) Int. Cl.
*H01L 41/04* (2006.01)
*H02N 2/18* (2006.01)

(52) U.S. Cl. .................................. 310/328; 310/339
(58) Field of Classification Search .............. 310/328, 310/339
See application file for complete search history.

(56) References Cited

U.S. PATENT DOCUMENTS

| | | | | |
|---|---|---|---|---|
| 4,894,811 | A * | 1/1990 | Porzio | 367/174 |
| 5,479,064 | A * | 12/1995 | Sano | 310/328 |
| 6,074,178 | A * | 6/2000 | Bishop et al. | 417/322 |
| 6,236,143 | B1 | 5/2001 | Lesieutre et al. | |
| 6,356,007 | B1 * | 3/2002 | Silva | 310/331 |
| 6,465,936 | B1 * | 10/2002 | Knowles et al. | 310/328 |
| 6,858,970 | B2 | 2/2005 | Malkin et al. | |
| 6,894,460 | B2 | 5/2005 | Clingman | |
| 6,927,528 | B2 * | 8/2005 | Barillot et al. | 310/325 |
| 7,231,874 | B2 * | 6/2007 | Rastegar et al. | 102/207 |
| 7,436,104 | B2 * | 10/2008 | Clingman et al. | 310/339 |
| 7,462,976 | B2 * | 12/2008 | Semmere et al. | 310/328 |
| 7,521,840 | B2 * | 4/2009 | Heim | 310/330 |
| 7,521,847 | B2 * | 4/2009 | Heim | 310/311 |

| | | | | |
|---|---|---|---|---|
| 2006/0235300 | A1 * | 10/2006 | Weng et al. | 600/439 |

FOREIGN PATENT DOCUMENTS

WO   WO 02/086981   10/2002

OTHER PUBLICATIONS

Post-Buckled Precompressed (PBP) Actuators: Enhancing VTOL Autonomous High Speed MAVs by Ron Barrett; 46th AIAA/ASME/ASCE/AHS/ASC Structures, Structural Dynamics & Materials Conference Apr. 18-21, 2005, Austin, Texas.

(Continued)

*Primary Examiner*—Jaydi SanMartin
(74) *Attorney, Agent, or Firm*—Harness, Dickey & Pierce, P.L.C.

(57) ABSTRACT

A piezoelectric transducer able to convert an electrical signal into a mechanical motion. In various embodiments the transducer is used to form a motor and an actuator. In one embodiment a piezoceramic stack is supported as to experience a compressive load from a flexible beam. The flexible beam is installed under compression to assume an initial bowed shape. Applying an electrical signal to the piezoceramic stack causes decompression, and thus lengthening, of the stack. This in turn causes an increased compression of the flexible beam that causes it to flex from its initial bowed shape to an increased (i.e., more pronounced) bowed shape. An output member disposed against the flexible beam is driven by the flexing of the beam. Alternately applying and removing the electrical signal causes an alternating mechanical motion to be applied to the output member by the flexible beam.

19 Claims, 4 Drawing Sheets

OTHER PUBLICATIONS

Active Structures Using Buckling Beam Actuators by Eric M. Mockensturm; Jie Jiang; 44th AIAA/ASME/ASCE/AHS Structures, Structural Dynamics, and Materials Conference; Apr. 7-10, 2003, Norfolk, Virginia.

Improvement of actuation displacement of LIPCA implementing bifurcation phenomena by Quoc Viet Nguyen, Seungsik Lee, Hoon Cheol Park; Smart Structures and Materials 2006; Active Materials: Behavior and Mechanics, edited by William D. Armstrong, Proc. of SPIE vol. 6170, 6170L, (2006).

"Can a Coupling Coefficient of a Piezoelectric Device Be Higher Than Those of Its Active Material?" by George A. Lesieutre and Christopher L. Davis; reprinted from Journal of Intelligent Material Systems and Structures, vol. 8—Oct. 1997.

A Centrally-Clamped Parallel-Beam Bistable MEMS Mechanism by Jin Qiu, Jeffrey H. Lang, Alexander H. Slocum; 0-7803-5998-/4/1/ $10.00@2001IEEE.

A Curved-Beam Bistable Mechanism by Jin Qiu, Jeffrey H. Lang, Alexander H. Slocum; 1057-7157/04$20.00 copyright 2004IEEE.

* cited by examiner

ELECTRICAL-TO-MECHANICAL TRANSDUCER APPARATUS AND METHOD

CROSS REFERENCE TO RELATED APPLICATIONS

The present application is related in general subject matter to the following applications, each of which has been filed concurrently with the present application, and each of which is incorporated by reference into the present application:

U.S. application Ser. No. 11/551,515, filed Oct. 20, 2006 (now U.S. Pat. No. 7,436,104);
U.S. application Ser. No. 11/551,388, filed Oct. 20, 2006 (now U.S. Pat. No. 7,439,657);
U.S. application Ser. No. 11/584,304, filed Oct. 20, 2006;
U.S. application Ser. No. 11/584,305, filed Oct. 20, 2006.

FIELD

The present disclosure relates to piezoelectric and magnetostrictive devices, and more particularly to a transducer that makes use of an electrically responsive member, such as a piezoelectric or magnetostrictive member, to assist in converting electrical energy into mechanical energy.

BACKGROUND

Piezoelectric devices are presently being employed in greater numbers of applications and in a wide ranging area of technologies. Piezoelectric devices often make use of one or more piezoelectric ceramic wafers that are configured into an integrated component that is adapted to bow or deform in response to an electric current applied to the component. Such piezoelectric wafers also produce an electrical output when they are flexed or deformed from an initial, non-flexed configuration. Thus, piezoelectric wafers are especially useful in applications involving actuators and vibration energy harvesting apparatuses. The following U.S. patents and applications involve various implementations of piezoelectric materials, and are each hereby incorporated by reference into the present application: U.S. Pat. No. 6,858,970 and U.S. Ser. No. 10/909,784, filed Jul. 30, 2004.

Another well known device which has only recently achieved practicality is the Stirling engine. Stirling engines have existed in various forms for many years, however, it has been recent breakthroughs in the design of engine chamber seals that have made these devices practical. A Stirling engine utilizes temperature gradients to convert thermal energy into mechanical energy. Typically, the Stirling engine includes one or more pistons that are driven in a reciprocating fashion by converting thermal energy into mechanical energy. Recently, Stirling engines have shown promise as a low cost, high efficiency solar powered generator for U.S. power grid and spacecraft electric power generation systems. The ability of the Stirling engine to meet or exceed the performance of concentrated photovoltaics has been recently recognized by engineers and researchers interested in exploring alternative power generation systems for use in spacecraft.

One drawback with a typical Stirling engine is that the mechanical energy is typically converted to electrical energy using a very large AC electromagnetic generator. A large electromagnetic generator, however, can be a serious drawback for spacecraft applications, where weight is an important consideration.

Thus, it would be highly desirable to provide some means for generating electric power from a mechanical input device, for example, from one or more pistons of a Stirling engine. It would further be highly desirable if such a device formed a small, lightweight, and highly efficient apparatus for converting mechanical energy to electrical power. Such a device would significantly enhance the utility of other components, such as Stirling engines. Such a device could enable a Stirling engine to be used in various power generating applications which, at the present time, are not feasible because of the size and weight of typical electromagnetic generators presently employed for use with Stirling engines in power generating applications.

Another application where piezoelectric devices are finding considerable utility is with actuators and motors. In this instance, the piezoelectric device is used to convert received electrical energy and to convert it to a mechanical output. However, in these applications the efficiency of the implementation of the piezoelectric device has often been less than satisfactory. Accordingly, it would also be desirable to provide a piezoelectric actuator or motor that provides a more efficient mechanical output that previously developed piezoelectric-based actuators and motors.

SUMMARY

The present disclosure relates to a system and method for generating a mechanical output from an electrical input using an electrically responsive member, for example a piezoelectric member or a magnetostrictive member. The system and method can be used to form virtually any form of transducer, and is especially well suited to forming an actuator or motor that provides a mechanical (either linear, angular or circular) motion from an electrical input signal.

In one specific implementation, a piezoceramic stack is assembled mechanically in series with a flexible element. In one embodiment, the flexible element forms a flexible beam. One end of the flexible beam and one end of the piezoceramic stack are both held fixedly against movement. One end of each of the piezoceramic stack and the flexible beam are positioned adjacent to one another and both are free to move. The piezoceramic stack and flexible beam are further assembled such that the beam exerts a predetermined compressive stress on the piezoceramic stack, and further such that the beam assumes a normally slightly buckled or bowed shape when no electrical signal is being applied to the piezoceramic stack.

When an electrical signal is applied to the piezoceramic stack, it causes the stack to expand lengthwise as the stack decompresses. This causes the flexible beam to be compressed, which imparts a further bowing to the shape of the flexible beam. When the electrical signal is removed, the compressive force of the flexible beam causes the piezoceramic stack to return to its initial compressed length, and the flexible beam returns to its initial bowed shape. Alternately applying and removing the electrical signal causes an oscillating bowing motion of the flexible beam. An output member is positioned against or adjacent to an intermediate point along the length of the flexible beam, so as to be driven by the bowing and unbowing movement of the flexible beam. The output member can form a portion of an actuator, an electric motor, or any type of device that can make use of the flexing movement of the flexible beam.

A particular advantage of the above-described actuator or motor is the motion multiplication that the use of a flexible beam produces. Since the flexible beam is only slightly bowed before the piezoceramic stack lengthens (upon receipt of an electrical signal), the motion provided by the flexible beam, at an intermediate point along its length, is multiplied over the motion response that a rigid, linear member positioned adjacent to the free end of the piezoceramic stack would otherwise provide. Thus, a relatively small change in length of the piezoceramic stack produces a significantly pronounced mechanical motion at an intermediate point along the length of the flexible beam. This increased motion response can enhance the utility of the actuator or motor by providing a significantly increased stroke length to the member that is experiencing the movement of the flexible beam. Thus, the use of a beam-like shape for the flexible element helps to provide a significant force-to-displacement advantage that would be difficult to achieve with other types/arrangements of flexible elements.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
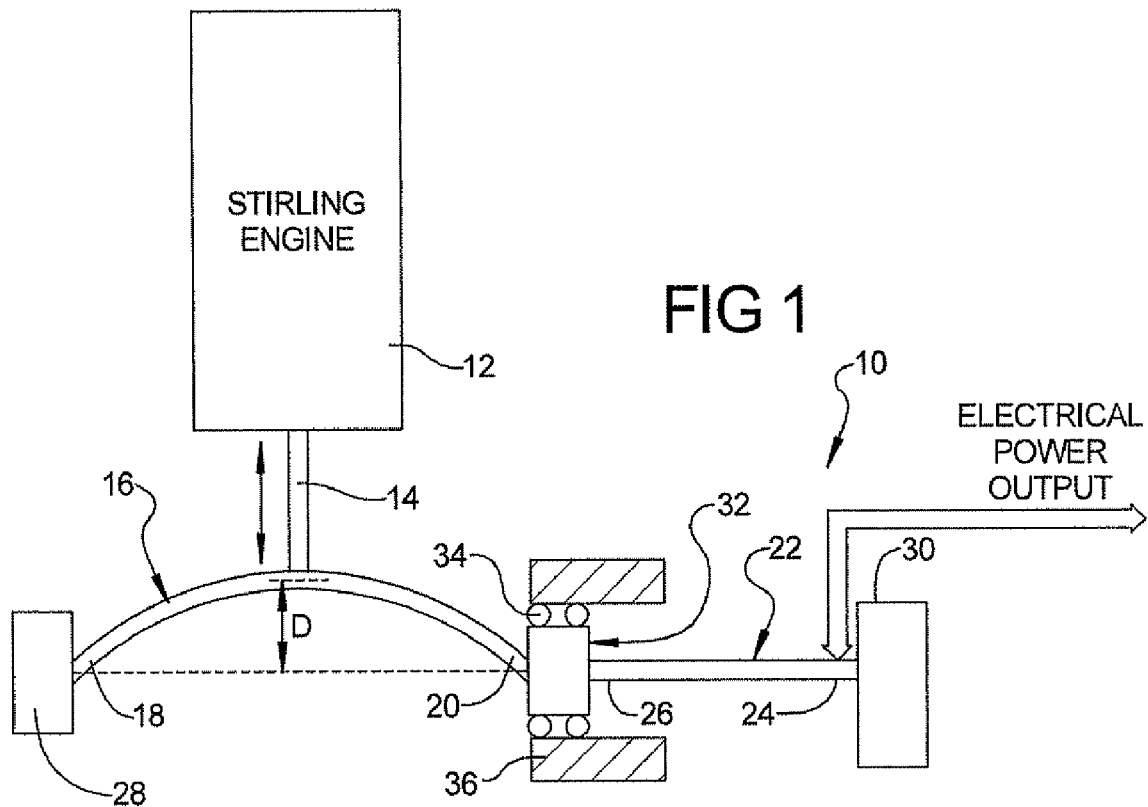
FIG. 1 is a simplified block diagram of a non-linear piezoelectric mechanical-to-electrical generator in accordance with one particular embodiment of the present disclosure, and showing a flexible beam and a piezoceramic stack of the apparatus in their initial orientations prior to an external mechanical force being applied to the flexible beam, with a Stirling engine being the device that is generating the mechanical input.

Referring to FIG. 1, there is shown a non-linear, mechanical-to-electrical generator apparatus 10 in accordance with one exemplary embodiment of the present disclosure. In this example, a Stirling engine 12 having a reciprocating output piston 14 is illustrated as the device that provides a mechanical input signal to the apparatus 10. However, it will be appreciated that any device that generates a reciprocating mechanical signal can be used with the apparatus 10. It is anticipated that the apparatus 10 will find particular utility in connection with a Stirling engine, as the apparatus 10 is able to readily convert the mechanical reciprocating motion of an output piston of such an engine to electric power. Stirling engines are discussed in the following patents, the disclosure of each of which is hereby incorporated by reference into the present disclosure: U.S. Pat. No. 6,871,495; U.S. Pat. No. 6,735,946 and U.S. Pat. No. 6,871,495.

The apparatus 10 includes a flexible beam 16 having a first end 18 and a second end 20. An electrically responsive member 22 in one form comprises a piezoceramic stack (i.e., a unitary stack of piezoelectric wafers), and has a first end 24 and a second end 26. Alternatively, the electrically responsive member 22 may be formed by a magnetostrictive material. The use of a piezoceramic stack or magnetostrictive material for the electrically responsive member 22 are both viewed as being equally applicable for use with the apparatus 10. Accordingly, while the following description will reference the electrically responsive member as "piezoceramic stack 22", it will be appreciated that a magnetostrictive material could readily be substituted in place of the piezoceramic material.

Figure 4:
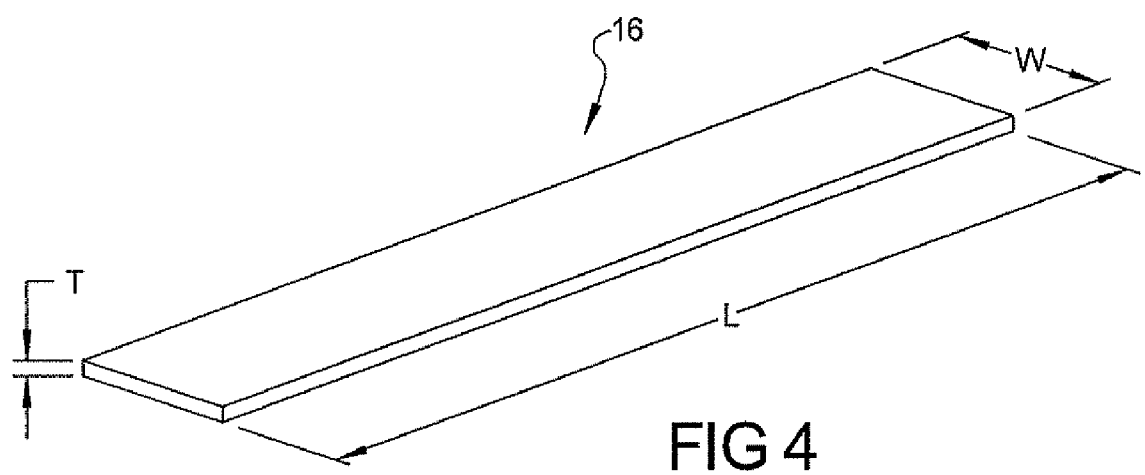
FIG. 4 is a perspective view of the flexible beam.

The flexible beam 16 may be formed from spring steel having a planar shape, as shown in FIG. 4, or as a planar leaf spring, or from any other material that is suitably flexible. The first end 18 of the flexible beam 16 is fixedly secured to a suitable support structure or frame member 28, while the first end 24 of the piezoceramic stack 22 is similarly fixedly secured to a support structure or frame member 30. The second ends 20 and 26 of the flexible beam 16 and the piezoceramic stack 22 may be secured directly to one another, or to an intermediate coupling assembly 32. Coupling assembly 32 includes a plurality of wheels 34 that are adapted to ride within a guide track or rail 36 to thus facilitate the smooth application and removal of a compressive force to/from the piezoceramic stack 22.

The flexible beam 16 and the piezoceramic stack 22 are also arranged such that their opposing free ends (i.e., ends 18, 20, 24 and 26) are all generally aligned along a common longitudinal axis extending through the piezoceramic stack 22. The Stirling engine 12 is preferably supported so that its piston 14 extends generally normal to the longitudinal axis extending through the piezoceramic stack 22. It will be appreciated that the stroke length of the piston 14 will be a factor that needs to be considered in determining the precise dimensions, and particularly the length, of the flexible beam 16.

With brief reference to FIG. 4, the flexible beam 16 has an overall (i.e., unbowed or "unbuckled") length "L", a thickness, and a width that may each vary widely to suit a specific application. In one exemplary form the length ("L") of the beam 16 is about 2.0 inches (50.4 mm), the width is about 0.5 inch (12.7 mm), and the thickness is about 0.030 inch (0.762 mm). The piezoceramic stack 22 may have a length that varies in accordance with the particular application with which the apparatus 10 is being interfaced with, and will be in part dependent on the length and stiffness of the flexible beam 16. In one exemplary form the uncompressed length of the piezoceramic stack may be about 0.5 inch (12.7 mm). The piezoceramic stack 22 may also take a variety of cross sectional shapes, for example rectangular, round, oval, square, or any other shape that might best suit the need of a particular application. In the present example, the piezoceramic stack 22 has a circular cross sectional shape having a diameter from about 0.375 inch to about 0.5 inch (9.525 mm-12.7 mm).

Figure 2:
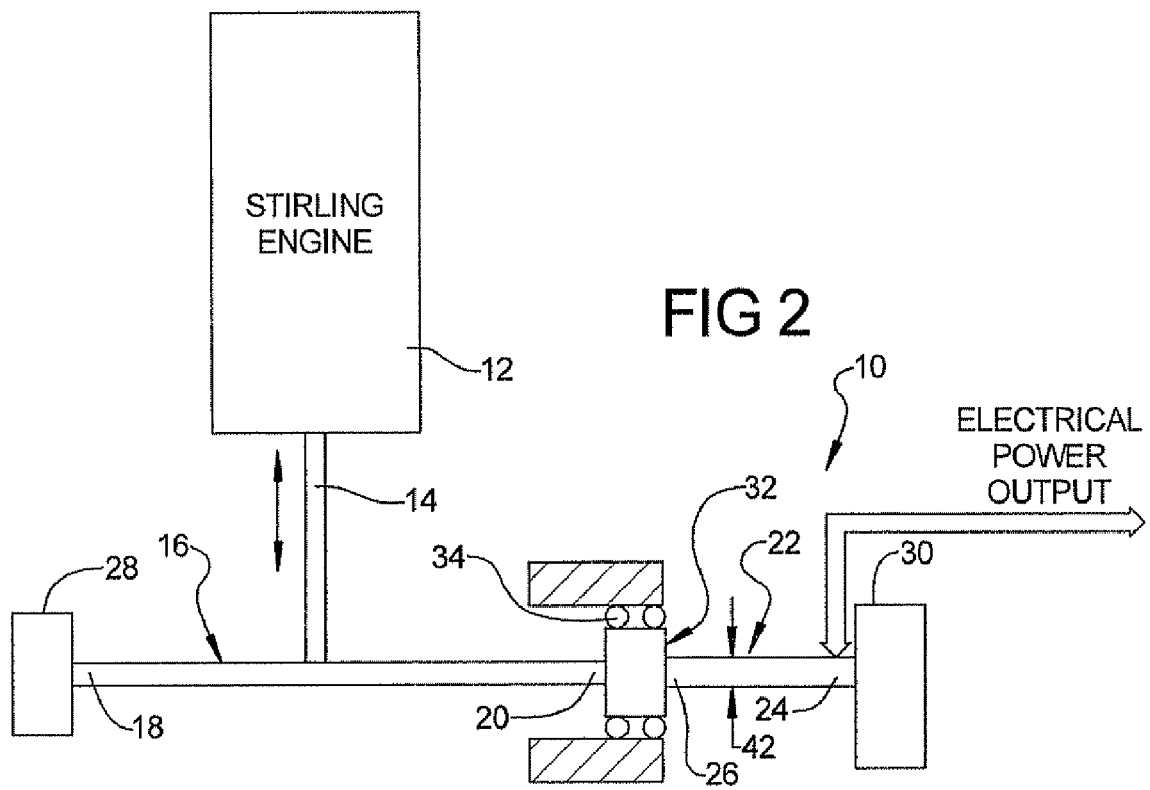
FIG. 2 is a simplified block diagram of the apparatus of FIG. 1, but with a piston of the Stirling engine extended to flatten the flexible beam, thus causing an increased compressive force to be exerted on the piezoceramic stack.
Figure 3:
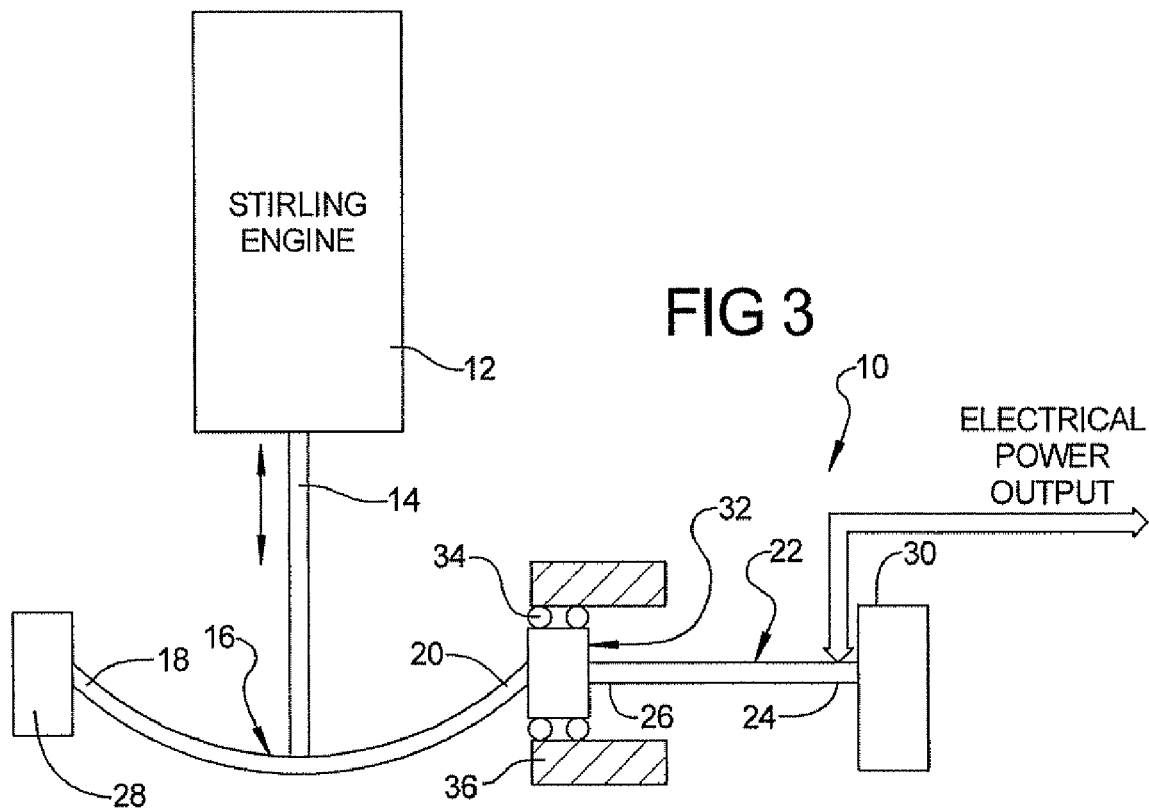
FIG. 3 is a simplified block diagram of the apparatus of FIG. 2, but with the piston of the Stirling engine fully extended to force the flexible beam past an over center position to a new bowed orientation.

Referring now to FIGS. 1-3, the operation of the apparatus 10 will be described. Referring initially to FIG. 1, the flexible beam 16 assumes one stable position. In this orientation the flexible beam is exerting a first, or minimum, degree of compressive force on the piezoceramic stack 22, but a force that is not sufficient to tangibly compress the piezoceramic stack 22. As the output piston 14 of the Stirling engine 12 initially begins to extend, it exerts a mechanical input force on the flexible beam 16. This flattens the beam 16, as indicated in FIG. 2. As the flexible beam 16 is flattened, it exerts a significantly increased compressive force on the piezoceramic stack 22, which causes the piezoceramic stack 22 to generate an electric current pulse output from electrical contacts (not shown) connected to the various layers thereof. This electrical pulse has a first polarity, for example a positive polarity. The orientation of the flexible beam 16 shown in FIG. 2 also represents an "over center" position. By "over center", it is meant that the flexible beam 16 will rapidly flex past this point as it is being moved toward the orientation shown in either FIG. 1 or FIG. 3, but will be unstable in the orientation of FIG. 2. In the position of FIG. 2, the flexible beam 16 is exerting a maximum degree of compressive force on the piezoceramic stack 22.

With reference specifically to FIGS. 2 and 3, as the piston 14 of the Stirling engine 12 extends to its maximum stroke length, it moves the midpoint of the flexible beam 16 past the over center position shown in FIG. 2. The flexible beam 16 then begins to release the compressive force on the piezoceramic stack 22. The compressive force continues to decrease as the flexible beam 16 moves into the orientation shown in FIG. 3. Once in the orientation shown in FIG. 3, the flexible beam 16 is again exerting the same minimum force as it did in the orientation shown in FIG. 1. The orientation shown in FIG. 3 forms a second stable position for the flexible beam 16. As the flexible beam 16 moves from the orientation shown in FIG. 2 to that shown in FIG. 3, the decompression of the piezoceramic stack 22 causes the stack 22 to generate another electrical output pulse. This electrical pulse will, however, be of the opposite polarity to the pulse that was created by the compressive movement described in connection with the movement of the flexible beam 16 from the orientation shown in FIG. 1 to that shown in FIG. 2. Thus, each complete extension or complete retraction of the piston 14 generates two electrical pulses from the piezoceramic stack 22. One complete cycle of the piston 14 (i.e., one extension stroke and one retraction stroke) thus generates four electrical pulses from the piezoceramic stack 22.

A significant advantage of the bowed configuration of the flexible beam 16 is that the flexible beam effectively operates as a "strain amplifier". By this it is meant that a relatively small mechanical motion (i.e., short mechanical stroke) applied at the midpoint of the flexible beam 16 will cause the beam 16 to generate a significantly large compressive pressure on the piezoceramic stack 22. For example, the compressive pressure generated on the second end 26 of the piezoceramic stack 22 may be up to or greater than 100 times the compressive pressure that would otherwise be generated by a linear linkage applying a force to the second end 26 of the piezoceramic stack 22. Obviously, the degree of amplification achieved will depend on the stiffness of the flexible beam 16, the length of the beam 16 and other design criteria. The stiffness and length of the flexible beam 16 can be tailored to meet the needs of a particular application.

The change in length of the piezoceramic stack 22, as a result of a compressive pressure from the flexible beam 16, is represented by dimension 38 in FIG. 2. Mathematically, this displacement can be expressed by the following formula:

$$\Delta_{stack}^{Piezoceramic} = \frac{\pi^2 D^2}{4L}$$

where "D" represents the distance separating a line bisecting the free ends of the flexible beam 16, and a line tangent to the midpoint of the beam 16 (FIG. 1); and where "L" represents the length of the unbuckled flexible beam 16 (FIG. 4).

The "critical" force required to move the flexible beam 16 between its two stable positions described above may also vary to suit the needs of a specific application. The critical force is also sometimes referred to as the "critical buckling load". In the exemplary embodiment being discussed, the critical force "Pcr" can be expressed by the formula:

$$Pcr = \frac{\pi^2 EI}{L^2}$$

where "E" is the elastic modulus of the material of the flexible beam 16;

where "I" is the area moment of inertia of the flexible beam 16; and where "L" is the length of the flexible beam 16.

The apparatus 10 can also be used in connection with a Stirling engine to form a "refrigerator", by intermittently applying and removing an electric current to the piezoceramic stack 22 that causes intermittent bowing and unbowing of the stack 22. The apparatus 10 is also expected to find utility in other applications where an electrical power output signal is desired in response to linear movement of a mechanical member.

Figure 5:
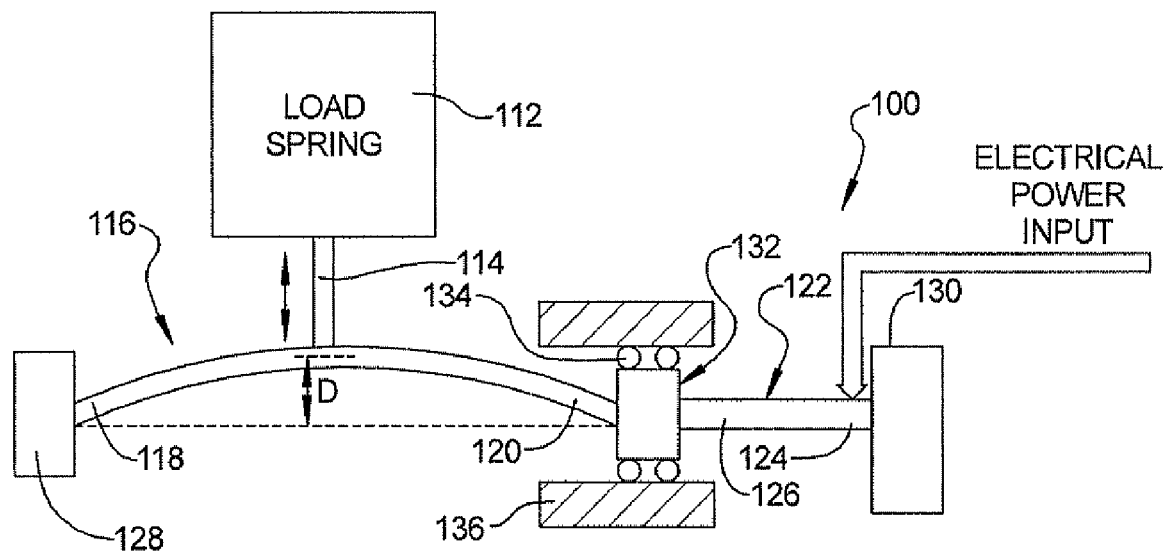
FIG. 5 is a simplified block diagram of one embodiment of an alternative implementation of the apparatus and method in which a piezoceramic stack is used to form an electrical-to-mechanical transducer to drive a load spring.

Referring to FIG. 5, a transducer in the form of an actuator apparatus 100 is shown in accordance with an alternative implementation of the teachings of the present disclosure. Components in common with those described in connection with apparatus 10 will be denoted by reference numerals increased by a factor of 100 over those used to describe the embodiment shown in FIGS. 1-4.

The apparatus 100 is substantially similar to the apparatus 10, and includes an electrically responsive member 122 which is installed under compression by a bowed flexible beam 116, which itself is also installed under compression to assume a slightly bowed or buckled shape. Again, the electrically responsive member 122 may be formed by a piezoceramic stack or by magnetostrictive material. For convenience, component 122 will be referred to as the "piezoceramic stack". The principal difference between apparatus 10 and apparatus 100 is that with apparatus 100, an electrical signal (e.g., a voltage) is alternately applied to and removed from the piezoceramic stack 122, which causes a corresponding alternating expansion (i.e., lengthening) and contraction (i.e., shortening lengthwise) of the stack 122. However, the flexible beam 116 in this embodiment does not flatten or move over center, as with the apparatus 10.

Figure 6:
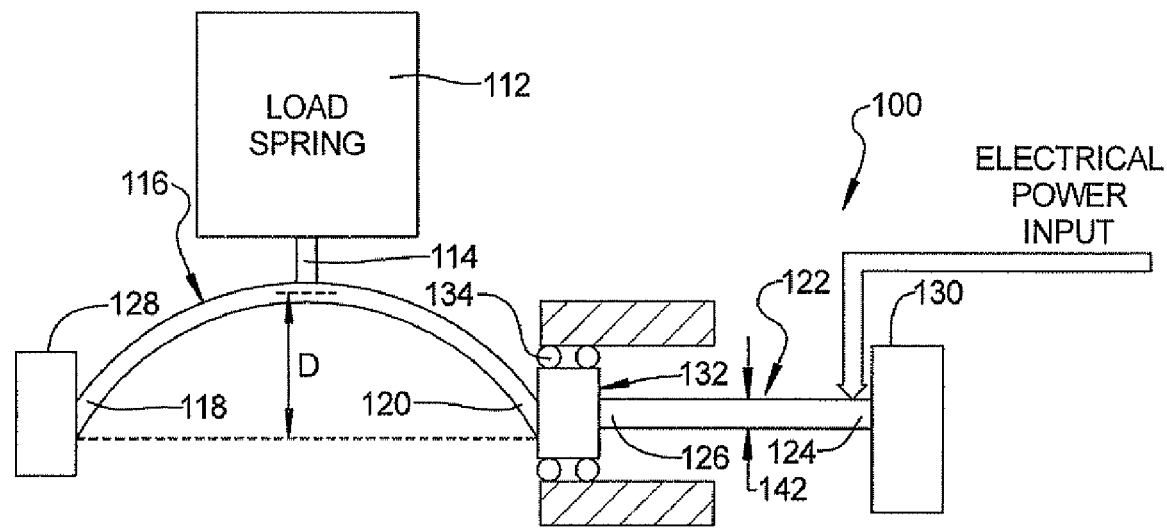
FIG. 6 is a block diagram of the apparatus of FIG. 5 but with a flexible beam of the apparatus being bowed by the force of the expanded piezoceramic beam, to thus drive an input member associated with a load spring in a linearly manner.

When the piezoceramic stack 122 lengthens, it urges coupling assembly 132 to move to the left, as indicated in FIG. 6. As this occurs, the flexible beam 116 is further bowed into the shape shown in FIG. 6. A linear member 114 in contact with the flexible beam 116 at an intermediate point along the length of flexible beam 116 is driven linearly as the flexible beam 116 bows. The member 114 moves in an up and down oscillating motion in accordance with the expansion and retraction of the piezoceramic stack 122. The member 114 may form a portion of a load spring 112 or any other device able to receive an oscillating mechanical signal.

An advantageous feature of the apparatus 100 is that the piezoceramic stack 122 provides a maximum available force at the beginning of its lengthening stroke, where the apparatus provides maximum stroke multiplication. At the end of the piezo stack 122 motion where available force is minimum, the motion amplification is minimum resulting in the ability of the apparatus to transfer more energy to a spring-like load than would be possible if the motion multiplication has a linear relationship.

The following equation shows the relationship between piezoceramic stack 122 motion and beam 116 center motion:

$$\frac{\Delta \text{Piezoelectric stack}}{D} = \frac{\pi^2 D}{2L}$$

where "D" is the distance separating a line bisecting the free ends of the beam 116 (FIG. 5) and a line tangent to the midpoint of the beam 116; and where "L" is the unbent (i.e., flat or unbowed) length of the beam 116.

Figure 7:
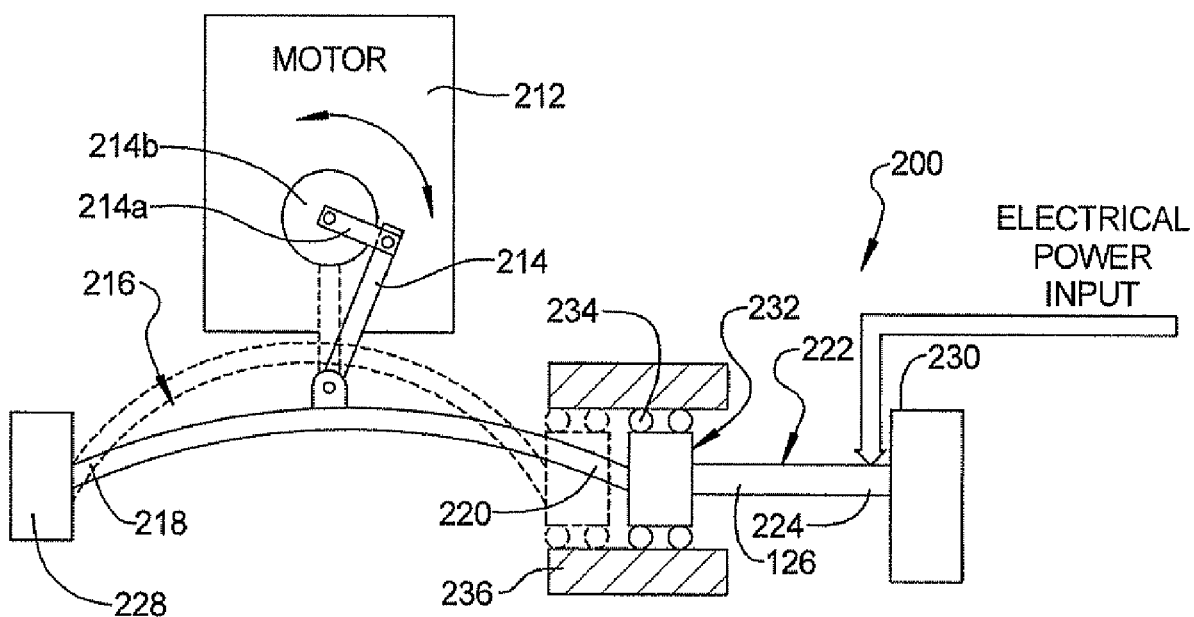
FIG. 7 is a simplified illustration showing how the apparatus of FIG. 5 could be configured to form a crankshaft-like driving arrangement to impart rotational movement to a rotationally supported member, to thus drive a motor.

Referring to FIG. 7, a motor apparatus 200 is illustrated in accordance with another embodiment of the present disclosure. The motor apparatus 200 is identical in construction to the apparatus 100 with the exception that an output member 214 is coupled pivotally at one end to a flexible beam 216. At its opposite end, the member 214 is pivotally coupled via a linkage assembly 214a to a rotationally mounted crank 214b. Apparatus 200 can thus be used to drive a crankshaft like output arrangement from the alternating bowing motion of the piezoceramic stack 222, to thus create rotational motion from the alternating compressing and decompressing of the piezoceramic stack 222.

While various embodiments and/or implementations have been described for the subject matter of the present disclosure, it will be appreciated that these are merely exemplary, and that other forms of transducers could be implemented from the teachings presented herein.

What is claimed is:

1. An electrical-to-mechanical motion transducer apparatus comprising:
   a flexible beam supported in an initial bowed configuration;
   an electrically responsive member supported adjacent one end of the flexible beam so as to be under a compressive force exerted by said flexible beam, said electrically responsive member operable to experience an increase in length in response to an electrical signal applied thereto; and
   said flexible beam being adapted to move into an increased bowed shape from said initial bowed shape in response to a compressive force exerted on said flexible beam by lengthening of said electrically responsive member, as said electrically responsive member receives said electrical signal, to convert said electrical signal into mechanical motion.

2. The apparatus of claim 1, further comprising a coupling assembly including a plurality of wheels for interfacing an end of said flexible beam to an end of said electrically responsive member.

3. The apparatus of claim 1, wherein a relationship between motion of the electrically responsive member and motion at a midpoint of the flexible beam is expressed by a relationship comprising:

$$\frac{\Delta \text{ length of the electrically responsive member}}{D} = \frac{\pi^2 D^2}{2L}$$

where "D" represents the distance separating a line bisecting the free ends of the flexible beam, and a line tangent to a midpoint of the flexible beam; and where "L" represents the length of the flexible beam in a flat configuration.

4. The apparatus of claim 1, wherein said flexible beam provides an a motion amplification factor of at least about four to a linear input motion provided by said electrically responsive member.

5. The apparatus of claim 1, wherein said electrically responsive member comprises a piezoceramic stack.

6. The apparatus of claim 1, wherein said electrically responsive member comprises a magnetostrictive material.

7. The apparatus of claim 1, wherein said motion transducer apparatus comprises a motor.

8. The apparatus of claim 1, wherein said motion transducer apparatus comprises an actuator.

9. An electrical-to-mechanical energy transducer apparatus, comprising:
   a flexible beam secured at a first end to a non-moveable structure, and having a second end;
   an electrically responsive member having a first end secured to a fixed structure, and a second end;
   said second ends of said flexible beam and said electrically responsive member being disposed adjacent one another, and said flexible beam further having a length such that, when installed between said non-movable structure and said second end of said electrically responsive member, said flexible beam assumes an initial bowed shape that exerts a compressive force on said electrically responsive member; and
   said electrically responsible member being adapted to receive an electrical signal and to lengthen in response thereto, and to exert a compressive force on said flexible beam that causes said beam to be urged into an increased bowed shape from said initial bowed shape; and
   an output member disposed adjacent to an intermediate point along a length of said flexible beam that is driven by flexing motion of said flexible beam.

10. The apparatus of claim 9, wherein said flexible beam provides a motion amplification factor of at least about four over a motion associated with lengthening of said electrically responsive member when said electrical signal is applied to said electrically responsive member.

11. The apparatus of claim 9, wherein said mechanical motion is imparted to said output member along a path generally normal to said flexible beam.

12. The apparatus of claim 9, further comprising a support assembly including a plurality of wheels, the support assembly interposed between said second ends to facilitate bowing and unbowing movement of said flexible beam.

13. The apparatus of claim 9, wherein a relationship between motion of the electrically responsive member and motion at a midpoint of the flexible beam is expressed by a relationship comprising:

$$\frac{\Delta \text{ length of the electrically responsive member}}{D} = \frac{\pi^2 D}{2L}$$

where "D" represents the distance separating a line bisecting the free ends of the flexible beam, and a line tangent to a midpoint of the flexible beam; and where "L" represents the length of the flexible beam in a flat configuration.

14. The apparatus of claim 9, wherein said electrically responsive member comprises a piezoceramic stack.

15. The apparatus of claim 9, wherein said electrically responsive member comprises a magnetostrictive material.

16. The apparatus of claim 9, wherein said apparatus comprises a motor.

17. The apparatus of claim 9, wherein said apparatus comprises an actuator.

18. The apparatus of claim 9, wherein said flexible beam is disposed mechanically in series with said electrically responsive member along a longitudinal axis extending through opposite ends of said electrically responsive member.

19. A method for forming an electrical-to-mechanical transducer, comprising:
  providing an electrically responsive member adapted to receive an electrical input signal;
  placing a flexible beam under compression against one end of said electrically responsive member, to thus place said electrically responsive member under an initial degree of compression, and such that said flexible beam assumes an initial bowed shape;
  applying an electrical signal to said electrically responsive member, that causes said electrically responsive to lengthen in length;
  using said lengthening of said electrically responsive member to further compress said flexible beam, to thus cause an increased bowing of said flexible beam; and
  imparting motion of said flexible beam caused by said increased bowing to an output member.

* * * * *